United States Patent

[11] 3,573,706

[72] Inventor Roland Haberlen
Tuttlingen, Germany
[21] Appl. No. 802,053
[22] Filed Feb. 25, 1969
[45] Patented Apr. 6, 1971
[73] Assignee J. Hengstler K. G. Zaherlerfabrick
Tuttlingen, Germany
[32] Priority Mar. 9, 1968
[33] Germany
[31] P 16 50 974.3

[54] CONNECTOR FOR MOUNTING A PRINTED CIRCUIT BOARD ON A MOUNTING BAR
2 Claims, 2 Drawing Figs.

[52] U.S. Cl. 339/17, 339/176, 339/217, 339/91
[51] Int. Cl. H01r 13/50, H05k 1/00
[50] Field of Search 339/17, 176 (MP), 217 (S)

[56] References Cited
UNITED STATES PATENTS

| | | | |
|---|---|---|---|
| 3,001,171 | 9/1961 | Schultz | 339/176(MP)X |
| 3,118,716 | 1/1964 | Brellier | 339/176(MP) |
| 3,199,066 | 8/1965 | Eledge et al. | 339/176(MP) |

*Primary Examiner*—Marvin A. Champion
*Assistant Examiner*—Terrell P. Lewis
*Attorney*—Polachek & Saulsbury

ABSTRACT: A device for connecting a printed circuit board to a mounting bar, includes a flat H-shaped leaf spring having first and second paris of flat legs integral with a flat crosspiece having a depending flat peg. One pair of legs has opposing hooks which engage under an abutment in the bar. The other pair of legs has noses with camming faces engaging in a hole in the board. The crosspiece overlays the abutment while the peg engages in a slot in the abutment which also receives the edge of the board.

Patented April 6, 1971 3,573,706

2 Sheets-Sheet 1

INVENTOR.

Roland Häberlen

By Golachek & Saulsbury

ATTORNEYS

Patented April 6, 1971 3,573,706

2 Sheets-Sheet 2

INVENTOR

Roland Häberlen

By Polachek & Saulsbury

ATTORNEYS

CONNECTOR FOR MOUNTING A PRINTED CIRCUIT BOARD ON A MOUNTING BAR

This invention relates to a detent device for connecting plug-in components, particularly for a detachable connection between printed circuit boards and mounting bars.

In the known plug connections between a printed circuit board and a mounting bar, only the retaining force of spring contacts was utilized or additional screw-threaded locking means were employed, which required the use of specially designed parts and additional operations.

According to the present invention, there is provided a detent connection device for mounting a printing circuit board on a mounting bar. The printed circuit board has at least one hole aligned with a notch in one edge thereof. The printed circuit board fits into a slot in a mounting bar. The slot terminates in an abutment in the bar. A spring catch is set in the slot in the mounting bar. This spring catch is an H-shaped flat leaf spring with coplanar oppositely directed pairs of flat legs, a crosspiece and central peg. One pair of legs has hooks to engage an abutment in the bar while the crosspiece overlays the abutment. Noses with camming faces are formed on ends of the other pair of legs to engage the hole in the printed circuit board. The peg engages in the slot in the bar. This detent spring ensures an interlock between the parts without need for additional fixing parts and does not require a change in the design of the spring-mounting bars. The required spring force can be determined by the selection of the material and thickness of the detent spring, which consists of a simple stamping.

The detent noses at one open end of the H-shaped spring may consist of resilient locking hooks, which instead of a pair of contact springs serve to lock the spring in the contact spring-mounting bar, whereas the detent noses at the other opening of the H-shaped spring consist of beveled spring cams, which are engageable with holes in the printed circuit boards and may have different inclinations to increase the detent action. With this arrangement, the printed circuit board or the unit can simply be pulled from the spring cams, without need for a previous unlocking, whereas the detent springs are anchored at one end in the spring-mounting bars.

An embodiment of the detent device provided by the invention for plug-in components is shown in the drawing for use with so-called prefabricated counter units.

Figure 1:
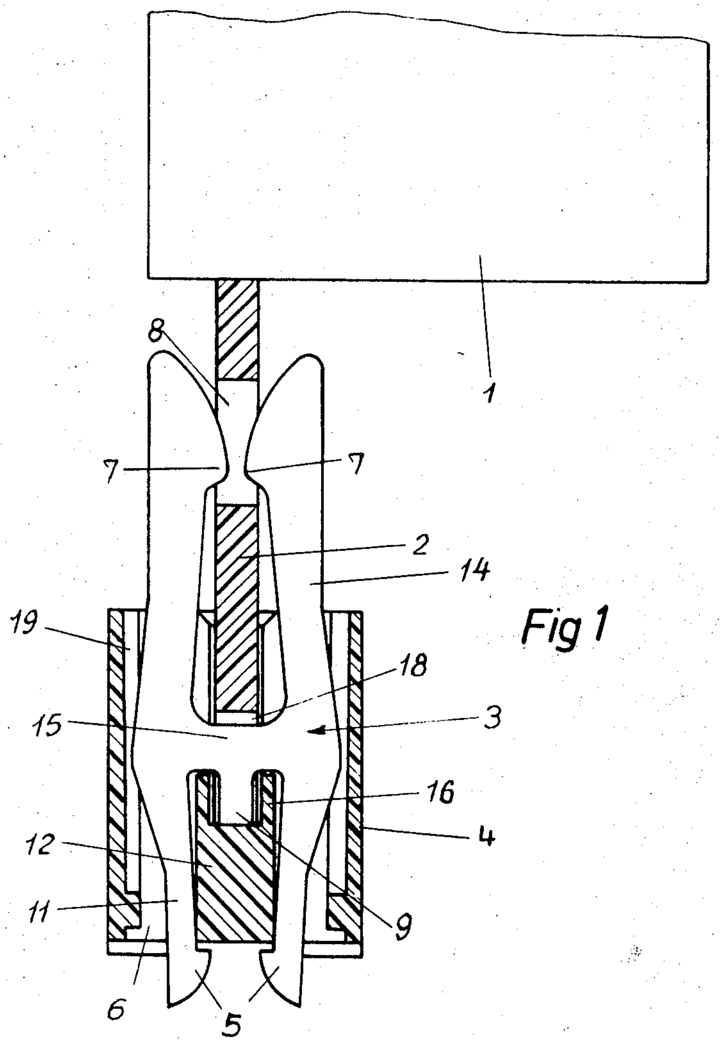
FIG. 1 is a central sectional view.
Figure 2:
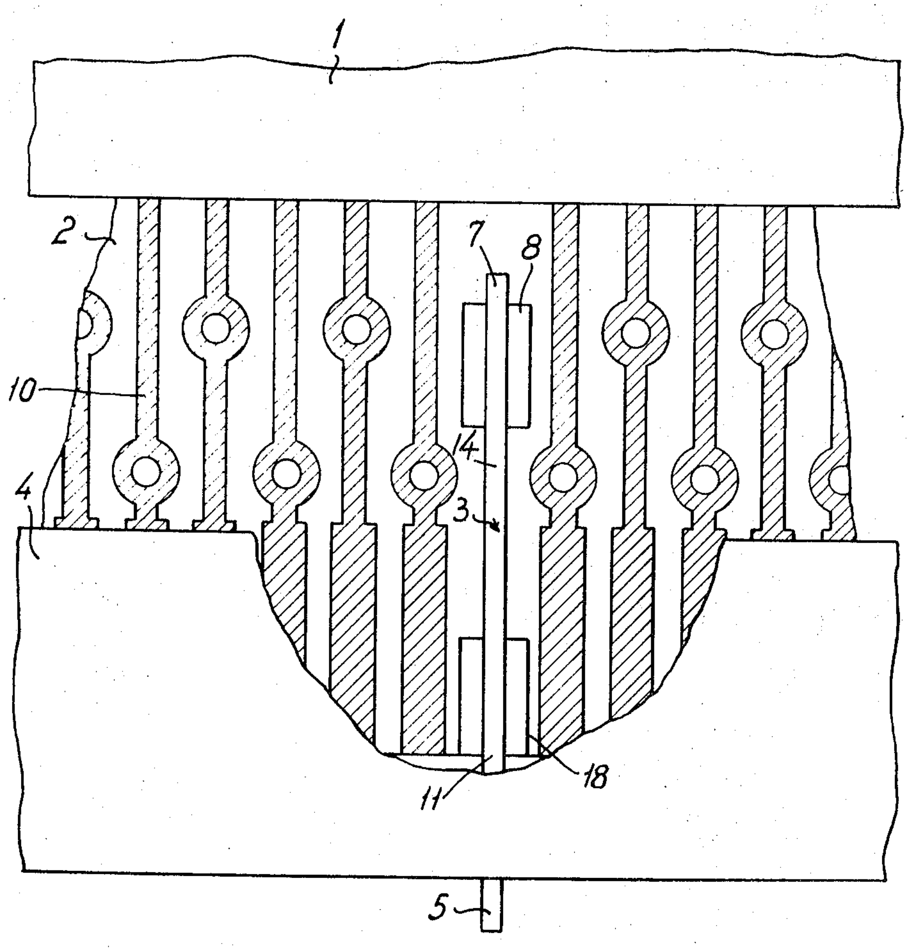
FIG. 2 is a top plan view of a detent device embodying the invention.

In the drawing, the unit 1 is provided with a depending printed circuit board 2, which in accordance with the invention is locked by detent spring device 3 to the mounting bar 4. The printed circuit board 2 is provided with printed contacts 10, which are connected to the mounting bar 4 when the parts are plugged together. The interlock may be simply established by the spring device 3 according to the invention. The spring catch device 3 is a flat H-shaped leaf spring. It has flat coplanar pairs of oppositely directed legs 11 and 14 integral with a flat crosspiece 15 which has a central depending coplanar integral peg 9 disposed between legs 11. Legs 11 have flat inwardly directed opposing hooks, 5. Legs 14 have flat inwardly directed opposing noses 7 formed with camming edges to enter hole 8 in the printed circuit board, 2. The board has a notch 18 at its edge aligned with hole 8.

Mounting bar 4 is formed with a first slot 16 which extends inwardly of the top edge of bar 4 and terminates in abutment 12 which extends inwardly of the other edge of the bar. Flat slot 19 in the bar is perpendicular to slot 16, it extends inwardly from the top edge of the bar and terminates in flat apertures 6 at the other edge of the bar. Legs 11 of the spring catch device extend through apertures 6 and engage under abutment 12. Legs 14 extend upwardly through slot 19 and noses 7 detachably engage in hole 8. The edge of board 2 fits into slot 16 and notch 18 straddles crosspiece 15 and peg 9. The peg fits into slot 16. By this arrangement the unit 1 is detachably secured to bar 4. If necessary, the spring catch 3 can be removed from bar 4 by spreading legs 11 with a tool until hooks 5 clear the abutment, whereupon the spring catch can be pulled out of slot 19.

I claim:

1. A device for connecting a printed circuit board to a mounting body, wherein the board has a hole therein disposed in alignment with a notch in one edge of the board, comprising a mounting bar having a first slot extending inwardly from one edge thereof to receive the notched edge of the printed circuit board, said slot terminating in an abutment extending inwardly from the other edge of said bar, and a second slot extending perpendicular to the first slot, said second slot extending inwardly from said one edge of the bar and terminating in flat apertures at the other edge of the bar; and a spring catch for the printed circuit board, said spring catch being a flat, H-shaped leaf spring having first and second pairs of spring legs integrally joined to a flat crosspiece, said first pair of legs being inserted through said apertures and terminating in inwardly directed opposing hooks engaging under said abutment to lock the spring catch in the bar with the crosspiece overlaying said abutment, said second pair of legs having inwardly directed noses formed with camming faces for releasably engaging in said hole in said board while said notch straddles the crosspiece in said first slot.

2. A device as defined in claim 1, further comprising a flat peg coplanar and integral with said crosspiece and extending between said first legs to engage in said first slot in the bar.